US008223461B2

(12) United States Patent
Huang et al.

(10) Patent No.: US 8,223,461 B2
(45) Date of Patent: Jul. 17, 2012

(54) PURE ROTARY MICROACTUATOR

(75) Inventors: Fu-Ying Huang, San Jose, CA (US);
Jifang Tian, Fremont, CA (US)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 1003 days.

(21) Appl. No.: 11/904,928

(22) Filed: Sep. 28, 2007

(65) Prior Publication Data
US 2009/0086378 A1  Apr. 2, 2009

(51) Int. Cl.
*G11B 5/56* (2006.01)
(52) U.S. Cl. ....................................... 360/294.4
(58) Field of Classification Search ........... 360/294.1, 360/294.4, 294.5, 294.6, 245, 245.6; 310/311, 310/323.06, 367, 368, 369
See application file for complete search history.

(56) References Cited

U.S. PATENT DOCUMENTS

| | | | |
|---|---|---|---|
| 5,521,778 A * | 5/1996 | Boutaghou et al. | 360/264.5 |
| 5,781,380 A * | 7/1998 | Berding et al. | 360/264.2 |
| 6,307,169 B1 | 10/2001 | Sun et al. | |
| 6,331,923 B1 | 12/2001 | Mei | |
| 6,396,667 B1 | 5/2002 | Zhang et al. | |
| 6,501,623 B1 * | 12/2002 | Vigna et al. | 360/245.3 |
| 6,522,050 B2 | 2/2003 | Sivadasan et al. | |
| 6,587,313 B2 * | 7/2003 | Kurihara et al. | 360/294.4 |
| 6,600,634 B1 | 7/2003 | Kim et al. | |
| 6,624,981 B1 * | 9/2003 | Vigna | 360/294.3 |
| 6,653,763 B2 | 11/2003 | Wang et al. | |
| 6,697,211 B2 | 2/2004 | Koganezawa | |
| 6,735,055 B1 | 5/2004 | Crane et al. | |
| 6,757,140 B1 | 6/2004 | Hawwa | |
| 6,760,196 B1 * | 7/2004 | Niu et al. | 360/294.6 |
| 6,809,907 B1 * | 10/2004 | Vigna et al. | 360/294.3 |
| 6,856,070 B2 * | 2/2005 | Wang et al. | 310/317 |
| 6,961,221 B1 * | 11/2005 | Niu et al. | 360/294.4 |
| 7,050,259 B1 | 5/2006 | Guo et al. | |
| 7,440,216 B2 * | 10/2008 | Wu et al. | 360/75 |
| 2004/0027029 A1 | 2/2004 | Borwick, III et al. | |
| 2006/0044699 A1 | 3/2006 | Hirano et al. | |
| 2007/0070552 A1 | 3/2007 | Yao et al. | |

FOREIGN PATENT DOCUMENTS

EP  1443018  8/2004

OTHER PUBLICATIONS

Hirano, et al., "Micro-actuator for Tera-Storage", *Micro Electro Mechanical Systems*, (Jan. 1999), 17-21.

Fan, et al., "Electrostatic Microactuator and Design Considerations for HDD Applications", *IEEE Transactions on Magnetics*, vol. 35, No. 2, (Mar. 1999), 1000-1005.

Tomikawa, et al., "Piezoelectric Actuators in Rotary or Linear Motions by Excitation of Asymetric Displacement", *IEEE Magazine*, (1992), 537-540.

(Continued)

*Primary Examiner* — Angel A. Castro

(57) ABSTRACT

A pure rotary microactuator comprising a spring assembly etched within a silicon substrate is disclosed. A first piezoelectric device is coupled with a first portion of the spring assembly and a second piezoelectric device coupled with a second portion of the spring assembly. The first piezoelectric device changes shape in response to an electrical input signal, and this change in shape provides a first push force to the first portion of the spring assembly in a first direction. The second piezoelectric device also changes shape in response to the electrical input signal, and this change in shape provides a second push force to the second portion in a second direction, which is different from the first direction. The combination of the first and the second push forces rotates the spring assembly with respect to the silicon substrate.

13 Claims, 7 Drawing Sheets

OTHER PUBLICATIONS

Cho, et al., "A Low-Voltage Push-Pull SPDT RF MEMS Switch Operated by Combination of Electromagnetic Actuation and Electrostatic Hold", *IEEE Magazine*, (2005),32-35.

Zhong, et al., "A Suspension Integrated with a Piezoelectric Microactuator for Dual Stage Actuation", *SpringerLink Journal Article*, (Jun. 2004),1-2.

Bergander, et al., "Monolithic Piezoelectric Push-Pull Actuators for inertial Drives", *IEEE Magazine*, (2003),309-316.

Lau, et al., "A Piezoelectric. Quad-Morph Actuated Suspension for Hard Disk Drives", *Electronic Journals*, (Jul. 28, 2006),1-2.

Syms, et al., "MEMS Angular Positioning Stage With a Vernier Latch", *Optical and Semiconductor Devices Group, EEE Dept.*, (2005),1-4.

* cited by examiner

600

```
Determining that a slider needs to be rotated relative to
a magnetic storage medium in a hard disk drive (HDD),
wherein the slider is coupled to a microactuator
comprising a spring assembly etched within a silicon
substrate, a first piezoelectric device coupled to a first
portion of the spring assembly, and a second
piezoelectric device coupled to a second portion of the
spring assembly
610
```

↓

```
Generating an electrical input signal
620
```

↓

```
Applying a pure rotary force to the spring assembly by
applying the electrical input signal to the first and
second piezoelectric devices whereby inducing a
change in shape of the first and second piezoelectric
devices that provides a first push force to the first
portion in a first direction and a second push force to
the second portion in a second direction different from
the first direction, wherein the first and said second
push forces rotate the spring assembly with respect to
the silicon substrate
630
```

PURE ROTARY MICROACTUATOR

TECHNICAL FIELD

The invention relates to the field of hard disk drive development.

BACKGROUND ART

Electronic computing devices have become increasingly important to data computation, analysis and storage in our modern society. Modern direct access storage devices (DASDs), such as hard disk drives (HDDs) are heavily relied on to store mass quantities of data for purposes of future retrieval. As such long term data storage has become increasingly popular, and as the speed of microprocessors has steadily increased over time, the need for HDDs with greater storage capacity to store the increased amount of data has steadily increased.

However, the ability of a HDD to quickly read and write data to and from the magnetic storage media is highly dependent on the performance of the electromechanical components of the HDD. Modern HDDs, such as HDDs implementing magnetic storage media, are plagued by imperfections in their design which serve to degrade the efficiency with which such HDDs can operate. Thus, there exists a need for a more efficient paradigm for maximizing the operating efficiency of a HDD.

SUMMARY OF THE INVENTION

A pure rotary microactuator comprising a spring assembly etched within a silicon substrate is disclosed. A first piezoelectric device is coupled with a first portion of the spring assembly and a second piezoelectric device coupled with a second portion of the spring assembly. The first piezoelectric device changes shape in response to an electrical input signal, and this change in shape provides a first push force to the first portion of the spring assembly in a first direction. The second piezoelectric device also changes shape in response to the electrical input signal, and this change in shape provides a second push force to the second portion in a second direction, which is different from the first direction. The combination of the first and the second push forces rotates the spring assembly with respect to the silicon substrate.

Furthermore, a method for controlling a microactuator coupled with a slider in a hard disk drive (HDD) is disclosed. A slider in a hard disk drive (HDD), wherein the slider is coupled with a microactuator comprising a spring assembly etched within a silicon substrate, is determined to need to be rotated relative to a magnetic storage medium in the hard disk drive (HDD). An electrical input signal is then generated and applied to a first piezoelectric device coupled with a first portion of the spring assembly, and a second piezoelectric device coupled with a second portion of the spring assembly. Applying the electrical input signal to the first and second piezoelectric devices induces a change in shape of the first and second piezoelectric devices that provides a first push force to the first portion in a first direction and a second push force to the second portion in a second direction, wherein the second direction is different from the first direction. The combination of the first and the second push forces creates a pure rotary force that rotates the spring assembly with respect to the silicon substrate.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

FIG. 6 is a flowchart of a process for controlling a microactuator coupled with a slider in a hard disk drive (HDD) in accordance with an embodiment of the present invention.

DETAILED DESCRIPTION

Figure 1:
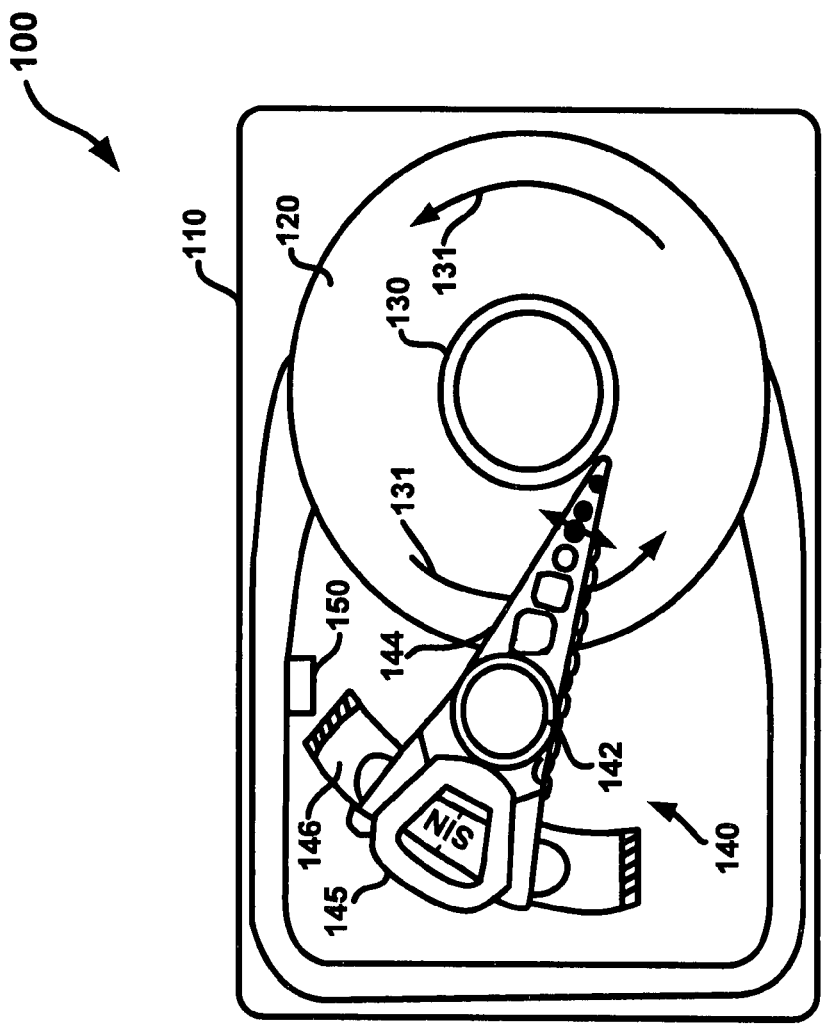
FIG. 1 is plan view of a hard disk drive (HDD) in accordance with an embodiment of the present invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the presented technology is intended to cover alternatives, modifications and equivalents, which may be included within the spirit and scope of the various embodiments as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

An embodiment of the present invention teaches a mechanism configured to rotate a slider in a head gimbal assembly (HGA) relative to a magnetic storage medium in a hard disk drive (HDD). A pure rotary microactuator comprises a spring assembly etched within a silicon substrate, a first piezoelectric device is coupled with a first portion of the spring assembly and a second piezoelectric device coupled with a second portion of the spring assembly. The first piezoelectric device changes shape in response to an electrical input signal, and this change in shape provides a first push force to the first portion of the spring assembly in a first direction. Similarly, the second piezoelectric device also changes shape in response to the electrical input signal, and this change in shape provides a second push force to the second portion in a second direction, which is different from the first direction. The combination of the first and the second push forces rotates the spring assembly with respect to the silicon substrate.

Various embodiments of the present technology illustrate various examples of how the spring assembly of the silicon substrate and the piezoelectric devices may be configured such that the piezoelectric devices can exert push forces on the spring assembly in response to an electrical input signal in order to create a pure rotary motion. The pure rotary motion of the spring assembly creates a pure rotary force that may be applied to a slider in the head gimbal assembly (HGA). Various other embodiments provide examples of how the electrical input signal can be varied in order to vary the amount of rotation experienced by the spring assembly.

Furthermore, a method for controlling a microactuator coupled with a slider in a hard disk drive (HDD) is disclosed. A slider in a hard disk drive (HDD), wherein the slider is coupled with a microactuator comprising a spring assembly etched within a silicon substrate, is determined to need to be rotated relative to a magnetic storage medium in the hard disk drive (HDD). An electrical input signal is then generated and applied to a first piezoelectric device coupled with a first portion of the spring assembly, and a second piezoelectric device coupled with a second portion of the spring assembly. Applying the electrical input signal to the first and second piezoelectric devices induces a change in shape of the first and second piezoelectric devices that provides a first push force to the first portion in a first direction and a second push force to the second portion in a second direction, wherein the second direction is different from the first direction. The combination of the first and the second push forces creates a pure rotary motion that rotates the spring assembly with respect to the silicon substrate.

It should be understood by those skilled in the art that various embodiments of the present invention increase the performance quality of a hard disk drive (HDD) because the stroke associated with a slider relative to a magnetic storage medium and the stiffness of a microactuator may be simultaneously increased. In this way, the slider is able to more efficiently track concentric data arrays located on a surface of the magnetic storage medium because the slider is provided a greater range of motion while experiencing smaller and fewer vibrations resulting from the dynamic coupling of the slider and the microactuator.

In addition, it is understood that various embodiments of the present technology provide a potentially large gain in reliability of a hard disk drive (HDD) because relatively simple structures are presented that are limited to a select few components. Since every component of a microactuator device is characterized by its own inherent failure probability, due at least in part to imperfections that may exist either in the materials which comprise the components, or the manufacturing processes used to fabricate, refine and assemble such components, the utilization of fewer components to carry out a given task will ultimately translate into a greater degree of reliability associated with operation of the microactuator device.

Numerous specific embodiments will now be set forth in detail to provide a more thorough understanding of the present technology. The discussion of these detailed embodiments will begin with an overview of a hard disk drive (HDD), and the components connected therein, according to embodiments of the present invention. The discussion will then focus on embodiments of the invention that provide a pure rotary microactuator configured to generate and apply a pure rotary force to a slider in the hard disk drive (HDD). The discussion will then focus on embodiments of the invention wherein the pure rotary microactuator comprises a spring assembly etched within a silicon substrate, wherein forces may be applied at various points of the spring assembly such that the spring assembly rotates relative to the remainder of the silicon substrate. The discussion will next focus on embodiments of the invention wherein a plurality of piezoelectric devices are coupled with the silicon substrate such that the application of an electric input signal to the piezoelectric devices causes the devices to change shape, which in turn causes a plurality of forces to be exerted on the spring assembly of the pure rotary microactuator. Finally, the discussion will focus on various other embodiments that provide examples of how a microactuator may be controlled so as to control the amount of rotation applied to a slider in a hard disk drive (HDD).

However, it should be understood by those skilled in the art that the present technology may be practiced without the specific details of the embodiments disclosed herein. Additionally, it should be understood that although the pure rotary microactuator control systems mentioned throughout this detailed description are often described as electronic systems, such control systems may be implemented utilizing hardware alone, or hardware in combination with one or more software modules that have been developed for the purpose of carrying out a task described herein. In other instances, well known methods, procedures, components, and circuits have not been described in detail as not to unnecessarily obscure aspects of the present embodiments.

Furthermore, although embodiments of the present invention will be described in conjunction with providing a pure rotary motion to a slider in a hard disk drive (HDD), it is understood that the embodiments described herein are useful outside of the art of hard disk drive (HDD) design, manufacturing and operation, such as in those instances when a pure rotary motion needs to be applied to a first object in order to rotate the first object relative to a second object. The utilization of the rotating slider example is only one embodiment and is provided herein merely for purposes of brevity and clarity. Finally, it should be understood that in embodiments of the present technology, one or more of the steps may be performed manually.

Hard Disk Drive (HDD) Configuration

With reference now to FIG. 1, a schematic drawing of one embodiment of an information storage system comprising a magnetic hard disk file or drive 100 for a computer system is shown. Drive 100 has an outer housing or base 110 containing a disk pack comprising at least one magnetic storage medium 120. A spindle motor assembly having a central drive hub 130 rotates the magnetic storage medium 120 in a circular direction. In this way, the magnetic storage medium 120 is rotated within the outer housing or base 110 by the spindle motor assembly and central drive hub 130 such that data may be read from and written to various points on the surface of the magnetic storage medium 120.

With reference still to FIG. 1, the drive 100 further includes an actuator assembly 140 that comprises one or more parallel actuator arms 141 (one shown) in the form of a comb that is movably or pivotally mounted to the base 110 about a pivot assembly 142. A voice coil 145, free to move within a conventional voice coil motor magnet assembly 146 (top pole not shown), is also mounted to one or more actuator arms 141. In one embodiment, a controller 150 is also mounted to the base 110 for selectively moving one or more parallel actuator arms 141 relative to the magnetic storage medium 120.

Figure 2:
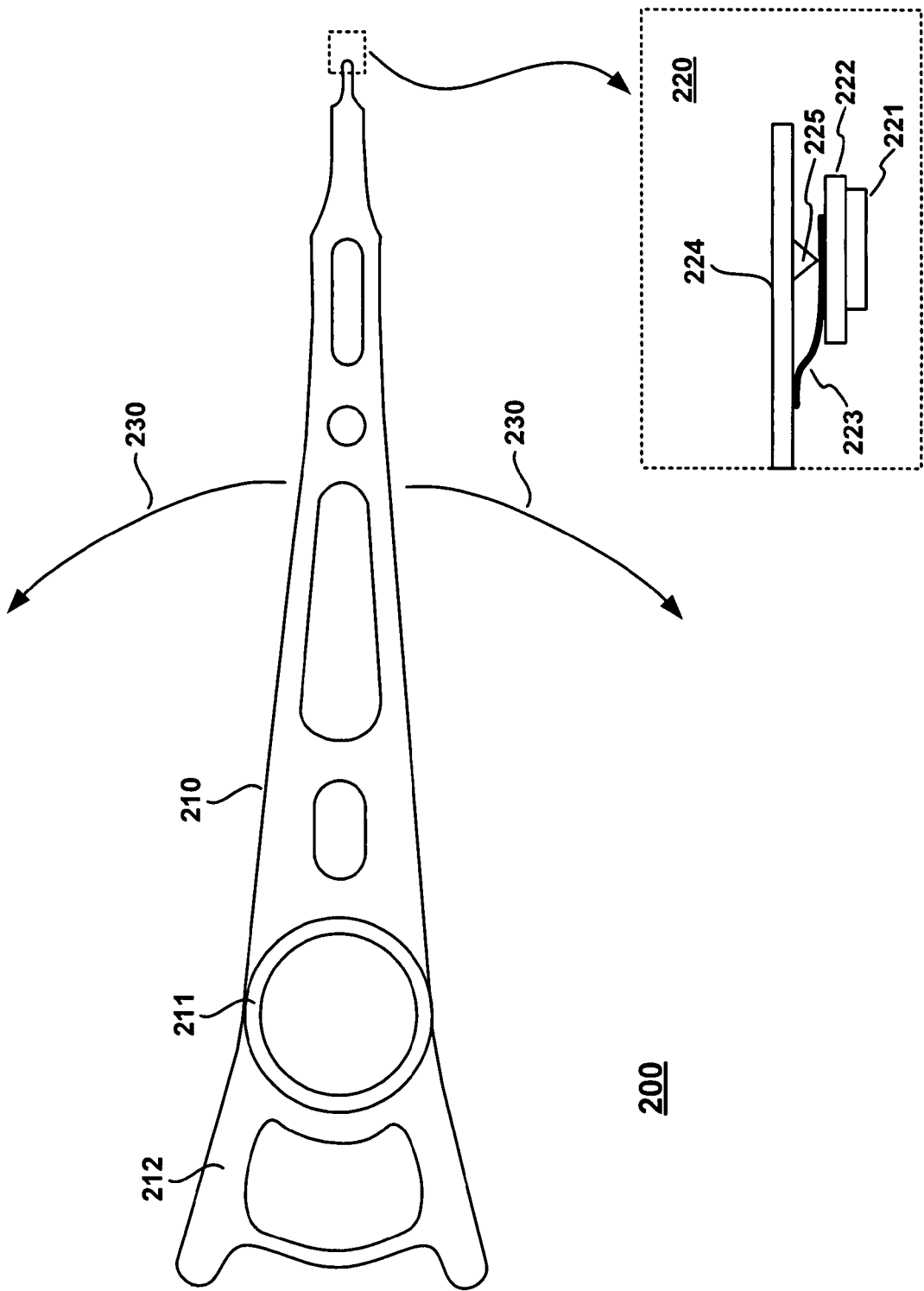
FIG. 2 is an isometric view of an actuator arm and a magnified, cross-sectional view of a head gimbal assembly (HGA), in accordance with an embodiment of the present invention.

With reference now to FIG. 2, an actuator arm configuration 200 in accordance with an embodiment of the present invention is shown. An actuator arm 210 is coupled with a head gimbal assembly 220 that comprises a magnetic read/write head (not shown). The magnetic read/write transducer or head is coupled with a slider 221 that is coupled with a microactuator 222. The head gimbal assembly 220 further comprises a flexure 223 coupled with a lead suspension 224 and flexibly mounted to the microactuator 222. In the embodiment shown, the flexure 223 supports the microactuator 222 relative to the lead suspension 224, and a dimple 225 separates the microactuator 222 from the lead suspension 224. Movement (illustrated by arrows 230) of the actuator arm 210 moves the head gimbal assembly 220 relative to the magnetic storage medium 120 such that the read/write head can magnetically read data from and/or magnetically write data to different points along the surface of the magnetic storage medium 120.

However, it should be understood by those skilled in the art that each of the plurality of parallel actuator arms 141 in the drive 100 has its own head gimbal assembly. Thus, in another embodiment, the head gimbal assemblies of the plurality of parallel actuator arms 141 operate in a conventional manner and move in unison with one another, unless drive 100 uses multiple independent actuators (not shown) comprising actuator arms configured to move independently of one another.

It should be further understood by those skilled in the art that the embodiment illustrated in FIG. 2 is exemplary of merely one configuration of a head gimbal assembly 220 according to an embodiment of the present technology. For instance, in an alternative embodiment, the head gimbal assembly 220 does not comprise the aforementioned flexure 223, and the microactuator 222 is coupled directly to the lead suspension 224. This configuration may be beneficial in the event that such a flexure 223 is characterized by an inherent degree of flexibility which serves to degrade the stiffness of the head gimbal assembly 220.

In another embodiment, the head gimbal assembly 220 comprises a fixture (not shown), and the fixture comprises a bonding material used to bond the slider 221 to the microactuator 222. For example, the fixture could comprise an adhesive material that is specially designed to bond specific components of a head gimbal assembly such that the fixture is rugged enough to withstand vibrations occurring during disk drive operation so that the components remain bonded together. In yet another embodiment, the fixture is configured to be more or less flexible to compensate for vibrations experienced by the head gimbal assembly 220 during operation of the actuator arm 210 in order to reduce the vibrations exerted on the slider 221 due to the dynamic coupling between the slider 221 and the microactuator 222.

With reference still to FIG. 2, the actuator arm 210 has extending from it at least one lead suspension 224. In one embodiment, the lead suspension 224 is a cantilevered electrical lead suspension (ELS). In another embodiment, the lead suspension 224 is an integrated lead suspension (ILS) that is formed by a subtractive process. In yet another embodiment, the lead suspension 224 may be formed by an additive process, such as a Circuit Integrated Suspension (CIS). In a further embodiment, the lead suspension 224 may be a Flex-On Suspension (FOS) attached to base metal or it may be a Flex Gimbal Suspension Assembly (FGSA) that is attached to a base metal layer. However, it should be understood by those skilled in the art that the lead suspension 224 may be any form of lead suspension that can be used in a Data Access Storage Device (DASD), such as a hard disk drive (HDD).

In another embodiment, the lead suspension 224 has a spring-like quality, which biases or presses the air-bearing surface of the slider 221 against the magnetic storage medium 120 to cause the slider 221 to fly at a precise distance from the disk. The lead suspension 224 also has a hinge area that provides for the spring-like quality, and a flexing interconnect that supports read and write traces through the hinge area.

With reference still to FIG. 2, a voice coil 212, free to move within a conventional voice coil motor (VCM) magnet assembly (not shown), is also mounted to the actuator arm 210 opposite the head gimbal assembly 220. The voice coil motor (VCM) magnet assembly comprises a magnet located next to the voice coil 212 such that an electrical current traveling through the voice coil 212 generates a magnetic field through the coil 212, through a process of magnetic inductance, thus causing the actuator arm 210 to move relative to the pivot assembly 211. In one embodiment, the controller 150 is configured to control the current traveling through the voice coil 212 so as to control the rotation of the actuator arm 210 about the pivot assembly 211.

Movement of the actuator arm 210 (indicated by arrows 230) causes the head gimbal assembly 220 to move along radial arcs across tracks on the magnetic storage medium 120 until the magnetic read/write head settles on its set target track. The magnetic read/write transducer or head coupled with the slider 221 reads data from and magnetically writes data to data arrays comprising radially spaced data information tracks located on the surface of the magnetic storage medium 120. This type of movement of the actuator arm 210 is generally referred to as "single-stage actuation", because the slider, which is coupled with the actuator arm 210 by means of the head gimbal assembly 220, is rotated relative to the pivot assembly 211.

Another embodiment of the present technology implements a system of "double-stage actuation" wherein operation of both the voice coil 212 and the microactuator 222 has a dynamic effect on the present location of the slider 221 relative to the magnetic storage medium 120. Specifically, the microactuator 222 is configured to operate as a small motor that takes into account the sway and other vibrations experienced by the slider 221, wherein such vibrations are the result of, inter alia: (1) the inertia generated by the movement 230 of the actuator arm 210, and (2) the windage created by the high-speed rotation 131 of the magnetic storage medium 120. The microactuator 222 then adjusts for these factors by moving the slider 221 relative to the magnetic storage medium 120 such that the magnetic read/write head 310 is in a better position to magnetically read data from and magnetically write data to specific data arrays located on the surface of the magnetic storage medium 120.

Figure 3:
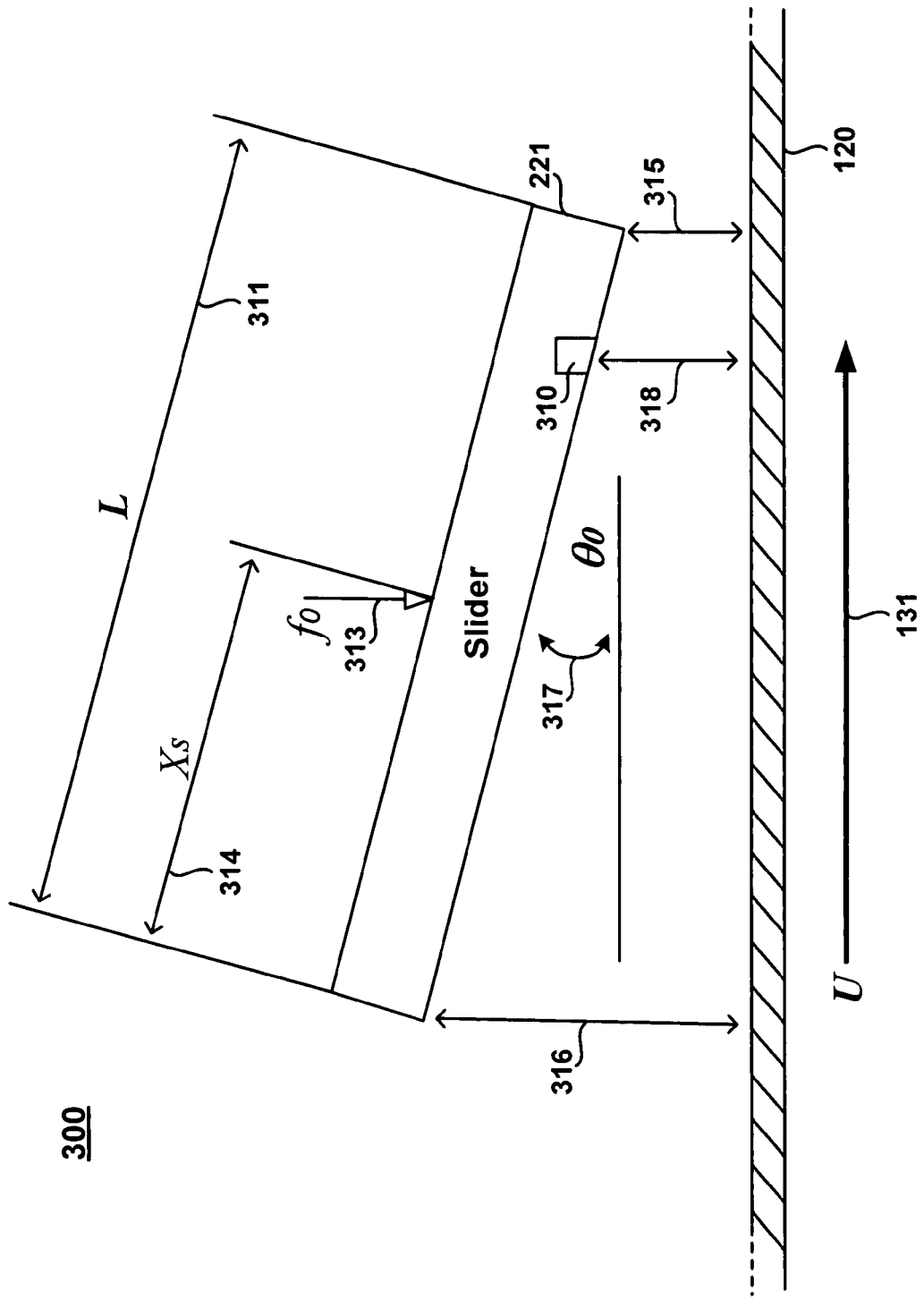
FIG. 3 is a cross-sectional view of a slider in relation to a magnetic recording medium, in accordance with an embodiment of the present invention.

With reference now to FIG. 3, a fly-height configuration 300 in accordance with an embodiment of the present invention is shown. The fly-height configuration comprises a slider 221 that is coupled with a magnetic read/write head 310. The slider 221 has a finite length 311 and is suspended by a fixture (not shown) at a fixture point 313 that is located a pre-defined distance 314 from an end of the slider 221. The slider 221 is suspended from the fixture at the fixture point 313 such that a horizontal axis associated with the finite length 311 is skewed relative to a magnetic storage medium 120 according to a normalized pitch angle 317 of the slider 221. This skewed orientation causes the leading edge of the slider 221 to fly above the magnetic storage medium 120 according to a leading fly-height. Similarly, the trailing edge of the slider 221 flies above the magnetic storage medium 120 according to a trailing fly-height.

With reference still to FIG. 3, the magnetic read/write head 310 flies above the magnetic storage medium 120 at a transmission fly-height 318. The magnetic read/write head 310 is configured to magnetically read data from and magnetically write data to data arrays comprising radially spaced data information tracks located on the surface of the magnetic storage medium 120. The ability of the magnetic read/write head 310 to operate efficiently depends on the location of the read/write head 310 relative to the magnetic storage medium 120. Therefore, changing the position of the slider 221 relative to the magnetic storage medium 120 will impact the operating efficiency of the drive 100.

Slider Rotation Using a Pure Rotary Force

Generally, the operation of a hard disk drive (HDD) is generally plagued by high frequency vibrations which decrease overall drive performance. Such vibrations generally occur as the result of an inertial force generated by the actuator arm rapidly rotating in order to seek data tracks on the surface of a magnetic disk surface, or as the result of a windage force exerted to the slider due to the high rate of speed with which the magnetic disk rotates relative to the slider. Thus, during normal operation, both the actuator arm and the suspension experience a large amount of mechanical excitation due to these vibrations, which serves to degrade the ability of the read/write heads in the head stack assembly (HSA) to read data from and write data to the data tracks on the disks' surfaces because the sliders are not able to place these heads in the ideal locations for data communication due to these vibrations.

In order to address this problem, many modern day hard disk drives (HDDs) implement a process of "dynamic actuation," wherein both an actuator arm and a suspension bend or sway in response to a high frequency vibration. Various "double-stage actuators" have also been implemented, wherein an actuator arm rotates relative to a pivot assembly while a microactuator is employed to make tiny adjustments to the positioning of a slider in the head gimbal assembly (HGA) that is coupled with the rotating actuator arm. This latter implementation has become particularly popular among disk drive manufacturers.

However, past implementations of dynamic actuation have been mired by the inability to simultaneously increase both the stroke and stiffness characteristics of a head gimbal assembly (HGA). The stroke refers to the range of motion with which the microactuator can move the slider relative to a magnetic disk in the drive. In other words, stroke is the absolute correction range with which a microactuator can operate. It is beneficial for a head gimbal assembly (HGA) to have a relatively high degree of stroke so that the microactuator can better position the slider, and consequently the magnetic read/write head, over the data arrays on the surface of the magnetic disk. Thus, a higher degree of stroke translates into more efficient data transfer between the read/write head and the magnetic storage medium.

It is also beneficial for the components of the head gimbal assembly (HGA) to have a relatively high degree of stiffness, which refers to the degree of flexibility associated with the components of the head gimbal assembly (HGA). For instance, if the microactuator device is highly flexible, then it will be more sensitive to a windage force generated during operation of the hard disk drive (HDD). Thus, it is highly beneficial to the operation of a head gimbal assembly (HGA) that the microactuator be as stiff as possible, while still being able to function for its intended purpose. In particular, the microactuator should be designed to be fairly rigid at the specific point on the microactuator device to which the slider is coupled. The reason for this design parameter is that when the slider, which is coupled with the microactuator, is experiencing a windage force, a vibration will occur which is dependent on the stiffness of the microactuator. In other words, if the microactuator is not very stiff, a larger vibration will occur, because the microactuator will be able to flex more in response to the force created by the windage.

In past implementations relating to head gimbal configurations and microactuator designs, these two beneficial factors (stroke and stiffness) constituted a tradeoff. For example, a microactuator could be designed to have a relatively high degree of stroke but a relatively low degree of stiffness. This, in turn, would cause the head gimbal assembly to experience a larger degree of windage excitation in exchange for a broader absolute correction range. In contrast, past implementations that succeeded in realizing a higher degree of stiffness, and thus a lower windage excitation, also experienced a reduced stroke, which constituted a limitation on the microactuator's ability to correct the positioning of a slider and read/write head relative to a magnetic storage medium in the hard disk drive (HDD). Therefore, there currently exists a need in the field of hard disk drive (HDD) design in which the stroke and stiffness associated with the components of a head gimbal assembly (HGA) can be simultaneously increased.

Figure 4:
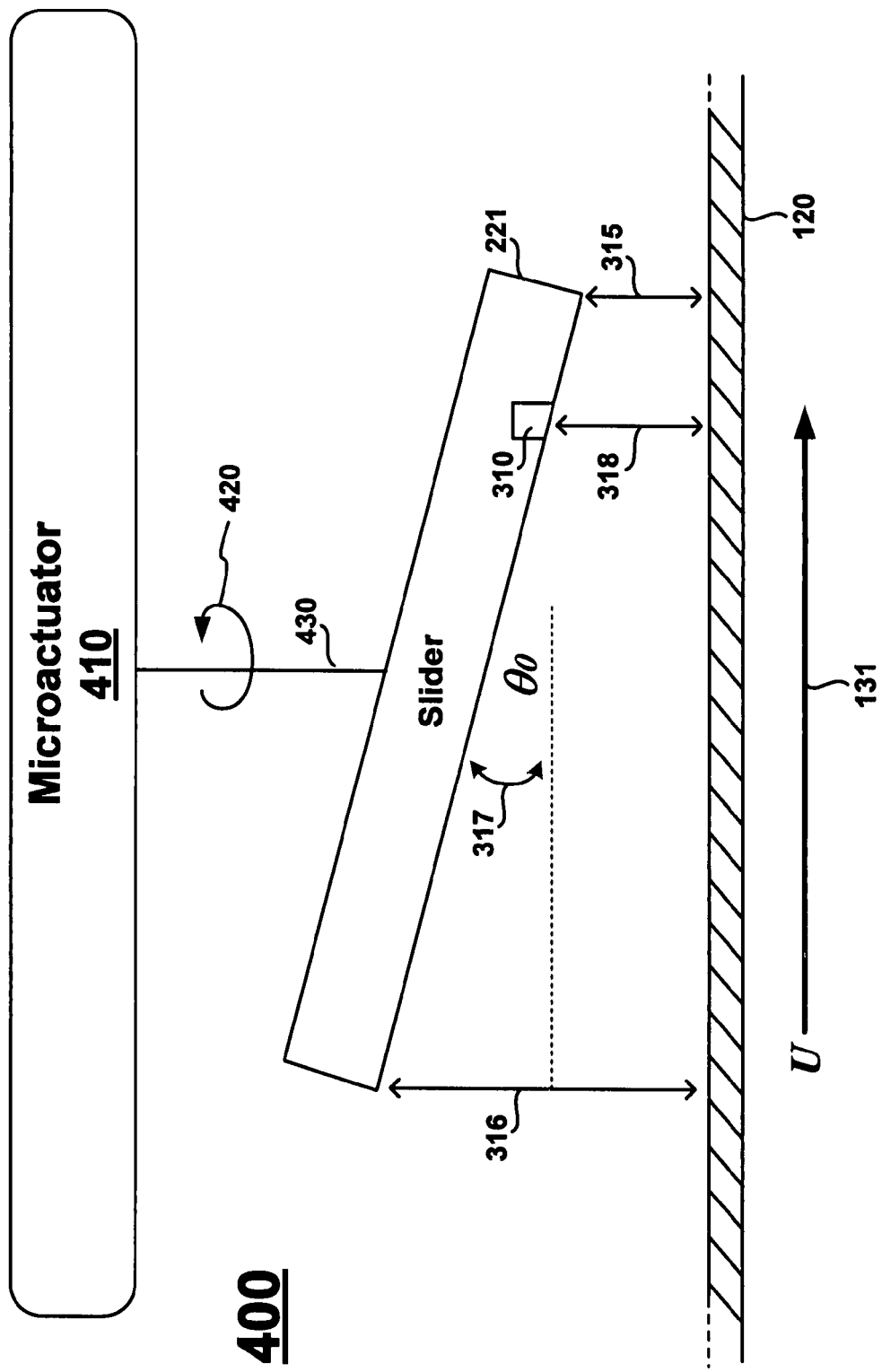
FIG. 4 is a cross-sectional view of a pure rotary microactuator and slider, in accordance with an embodiment of the present invention.

With reference now to FIG. 4, an embodiment of the present technology is shown that solves this problem by allowing those skilled in the art to implement a system 400 wherein the head gimbal assembly 220 comprises a pure rotary microactuator 410. The pure rotary microactuator 410 creates a pure rotary force 420 and applies this force 420 to a device with which the microactuator 410 is coupled. In the illustrated embodiment, the pure rotary microactuator 410 is coupled to a fixture 430, and the fixture 430 is coupled to a slider 221. In one embodiment, the fixture 430 is an adhesive material, such as a bonding glue, that is configured to bond a slider to a microactuator in a head gimbal assembly (HGA).

In the embodiment illustrated in FIG. 4, the fixture 430 suspends the slider 221 above the magnetic storage medium 120 in the drive 100. Thus, when the pure rotary microactuator 410 applies the pure rotary force 420 to the fixture 430, the fixture 430 is rotated in a direction corresponding to the applied pure rotary force 420. The inherent stiffness of the fixture 430 causes the pure rotary force 420 to be applied to the slider 221 to which the fixture 430 is coupled. In this manner, a greater degree of component stiffness translates into a larger rotary force being applied to the slider 221, which in turn creates a larger degree of stroke, or range of motion in which the pure rotary microactuator 410 can utilize to correct defects in the positioning of the slider 221 relative to the data tracks located on the surface of the magnetic storage medium 120.

In one embodiment, the fixture 430 is configured to be as stiff as possible while still being able to adhere to both the pure rotary microactuator 410 and the slider 221 during operation of the drive 100. Similarly, in another embodiment, the pure rotary microactuator 410 is configured to be as stiff as possible while still being able to couple with the lead suspension 224 and the fixture 430. As stated above, such component stiffness decreases the level of windage excitation and leads to smaller vibrations being generated in response to inertia forces created during dynamic actuation.

However, although the use of a microactuator is beneficial for overall performance of a hard disk drive (HDD), the presence of a microactuator in a head gimbal assembly adds an imperfection to the design because the microactuator has a mass which itself generates an inertia and can amplify vibrations delivered to the slider. Thus, in one embodiment, the size of the pure rotary microactuator 410 is configured to be as small as possible such that the mass of the pure rotary microactuator 410 is decreased, but such that the pure rotary microactuator 410 still functions for its intended purpose.

In an alternative embodiment, the pure rotary microactuator 410 is coupled with an outermost tip of the lead suspension 224. This configuration decreases windage excitation and aids in compensating for vibrations resulting from dynamic actuation by arranging the pure rotary microactuator 410 right at the tip of the lead suspension 224 where the pure rotary microactuator 410 couples the slider 221 to the suspension 224. Specifically, when the pure rotary microactuator 410 is located closer to the read/write head 310, the distance through which vibrations can travel between the pure rotary microactuator 410 and the read/write head 310 is diminished. In this manner, the inherent flexibility of the various components of the head gimbal assembly 220 makes a smaller contribution to the overall sensitivity of the actuator assembly 200 to vibrations occurring during operation of the drive 100. In addition, this configuration coupled with the application of the pure rotary force 420 to the slider 221 simultaneously increases the stiffness and stroke of the head gimbal assembly 220 because rotating the slider 221 relative to the actuator arm 210 and the magnetic storage medium 120 will create a greater range of motion with which the read/write head 310 can be repositioned over the magnetic storage medium.

With reference still to FIG. 4, the pure rotary force 420 created by the pure rotary microactuator 410 is applied to the slider 221 such that the slider 221 rotates relative to the magnetic storage medium 120. In one embodiment, the slider 221 is rotated relative to the magnetic storage medium 120 such that the transmission fly-height 318 of the magnetic read/write head 310 is kept constant. In this manner, the system 400 could be configured to provide a certain level of predictability regarding the efficiency with which the magnetic read/write head 310 is able to magnetically read data from and magnetically write data to the magnetic storage medium.

However, in another embodiment, the stroke factor of the head gimbal assembly 220 is further increased by adding a lever action to the applied rotational force 420. The combination of the pure rotary force 420 and the lever action causes the slider 221 to rotate relative to the magnetic storage medium 120 while the normalized pitch angle 317 of the slider 221 is also changed such that the transmission fly-height 318 is either increased or decreased, depending on whether the read/write head 310 needs to be located further from or closer to the magnetic storage medium. In this manner, the stroke factor is greatly increased because the range of motion with which the read/write head 310 may be repositioned relative to the magnetic storage medium 120 is greater than it would otherwise be if only a single force is used to move the magnetic read/write head 310 relative to the pure rotary microactuator 410.

With reference still to the prior embodiment, there are a myriad of possibilities for achieving such an increase in stroke. For example, a lever configuration could be implemented wherein a material is configured to change shape in response to a change in temperature. For instance, a temperature sensitive material could be positioned within the slider 221 along with a heating coil. The pure rotary microactuator 410 could be further configured to send an electronic signal to the heating coil, thus causing the coil to generate a requisite level of heat that causes the temperature sensitive material to change shape. This change in shape of the temperature sensitive material would cause the material to exert a force toward the fixture 430, and this force would cause the trailing edge of the slider to move away from the pure rotary microactuator 410 and towards the magnetic storage medium 120. In this manner, a lever action is created that causes the magnetic read/write head 310 to be repositioned closer to the magnetic storage medium 120.

In another example, a lever configuration could be implemented wherein a material is configured to change shape in response to an applied voltage. For instance, the material could comprise a substrate demonstrating piezoelectric properties such that application of a voltage through the substrate causes the substrate to expand. The substrate could be positioned somewhere within the head gimbal assembly 220 such that a change in shape of the substrate causes the normalized pitch angle 317 to either increase or decrease.

In an alternative embodiment, the fixture 430 comprises a piezoelectric substrate such that the application of a voltage to the substrate causes the fixture 430 to elongate, thus causing the fly-heights 315, 316, 317 associated with the slider 221 to decrease. In this manner, the pure rotary force 420 is combined with a downward force relative to the slider 221 which increases the range of motion within which the magnetic read/write head 310 can be repositioned relative to the magnetic storage medium 120.

Thus, the pure rotary force 420 generated by the pure rotary microactuator 410 may be combined with one or more forces having different directivities in order to further increase the stroke of the head gimbal assembly 220. The aforementioned embodiments are merely examples of how those skilled in the art might chose to implement various principles of the present technology, and are by no means meant to limit the possible applications of the present invention.

Spring Assembly

With reference still to the embodiment illustrated in FIG. 4, the pure rotary microactuator 410 is configured to generate a pure rotary force 420 and apply this force to the slider 221 in order to rotate the slider 221, and consequently the magnetic read/write head 310, relative to the magnetic storage medium 120. It should be understood by those skilled in the art that many possible methods exist for configuring the pure rotary microactuator 410 to carry out these functions. For instance, the pure rotary microactuator 410 could comprise a rotary motor assembly that implements a magnetic solenoid to create the requisite rotary force to rotate the slider 221. However, the use of such a rotary motor assembly has a negative impact on the level of inertia generated during movement 230 of the actuator arm 210 because the mass of the pure rotary microactuator 410 is increased due to the additional weight of the rotary motor assembly.

An embodiment of the present technology solves this problem by implementing a spring assembly that does not add a significant amount of weight to the pure rotary microactuator 410. For instance, a spring assembly could be etched into a piece of material that has a certain degree of inherent flexibility. Specifically, multiple mechanical components could be removed from the material according to a concentric pattern such that a first portion of the material is physically distinguishable from a second portion. The application of concentric forces at specific points around the spring assembly would cause the first portion to rotate relative to the second portion due to the inherent flexibility of the material. In this fashion, the weight of the pure rotary microactuator 410 is minimized because a single piece of material is used to form the spring assembly, thus minimizing the number of components present in the microactuator 410.

In another embodiment, the pure rotary microactuator 410 comprises a silicon substrate. Due to present advances in silicon fabrication and design, the use of a silicon substrate serves as a cost effect means of minimizing the weight of the pure rotary microactuator 410 while still allowing the microactuator 410 to function for its intended purpose. For example, by utilizing modern day fabrication techniques, a silicon substrate could be implemented that has a width of only 100 micrometers, but which would still be tough enough to withstand the physical strain associated with implementation of various embodiments of the present technology.

With reference still to the previous embodiment, portions of the silicon substrate are etched out such that a portion of the substrate is capable of rotating relative to the remainder of the substrate in response to an applied force. However, when the applied force is removed, the rotated portion of the substrate springs back to its original position relative to the remainder of the substrate. In this manner, the spring assembly is able to create a pure rotary motion in response to an applied force, but the substrate is not permanently deformed. Therefore, multiple forces can be applied over time to the spring assembly to create a plurality of pure rotary motions.

It is understood that the mass of the pure rotary microactuator 410 is minimized since the use of a single substrate does not add a significant amount of weight to the device. In fact, the weight of the un-etched substrate is actually decreased when the spring assembly is etched, since a specific amount of material is necessarily removed from the substrate during the etching process. However, it should be further understood by those skilled in the art that the spring assembly may be configured to exhibit more or less resistance to applied forces depending on how much material is removed from the substrate. For example, in one embodiment, less material is etched from the substrate so that the spring assembly exhibits more resistance to applied forces. This serves to increase the stiffness associated with the pure rotary microactuator 410 since the substrate will bend less in response to vibrational forces experienced during operation of the drive 100.

In an alternative embodiment, more material is etched from the substrate, which decreases the amount of resistance exhibited by the spring assembly. This latter embodiment increases the range of motion of the generated pure rotary motion because the portion of the substrate that is being rotated will be displaced by a larger radial distance. By coupling the slider 221 to this rotating portion, the range of motion of the slider will be correspondingly increased. Thus, the present embodiment would be useful for increasing the stroke associated with the head gimbal assembly 220.

Therefore, it should be appreciated by those skilled in the art that more or less silicon may be removed from the substrate during the etching process in order to meet the design specifications of an implemented embodiment of the present invention. However, the previous embodiments are simply examples of how principles of the present technology may be implemented, and they are not intended to limit the possible applications of the present invention.

Piezoelectric Devices

Figure 5A:
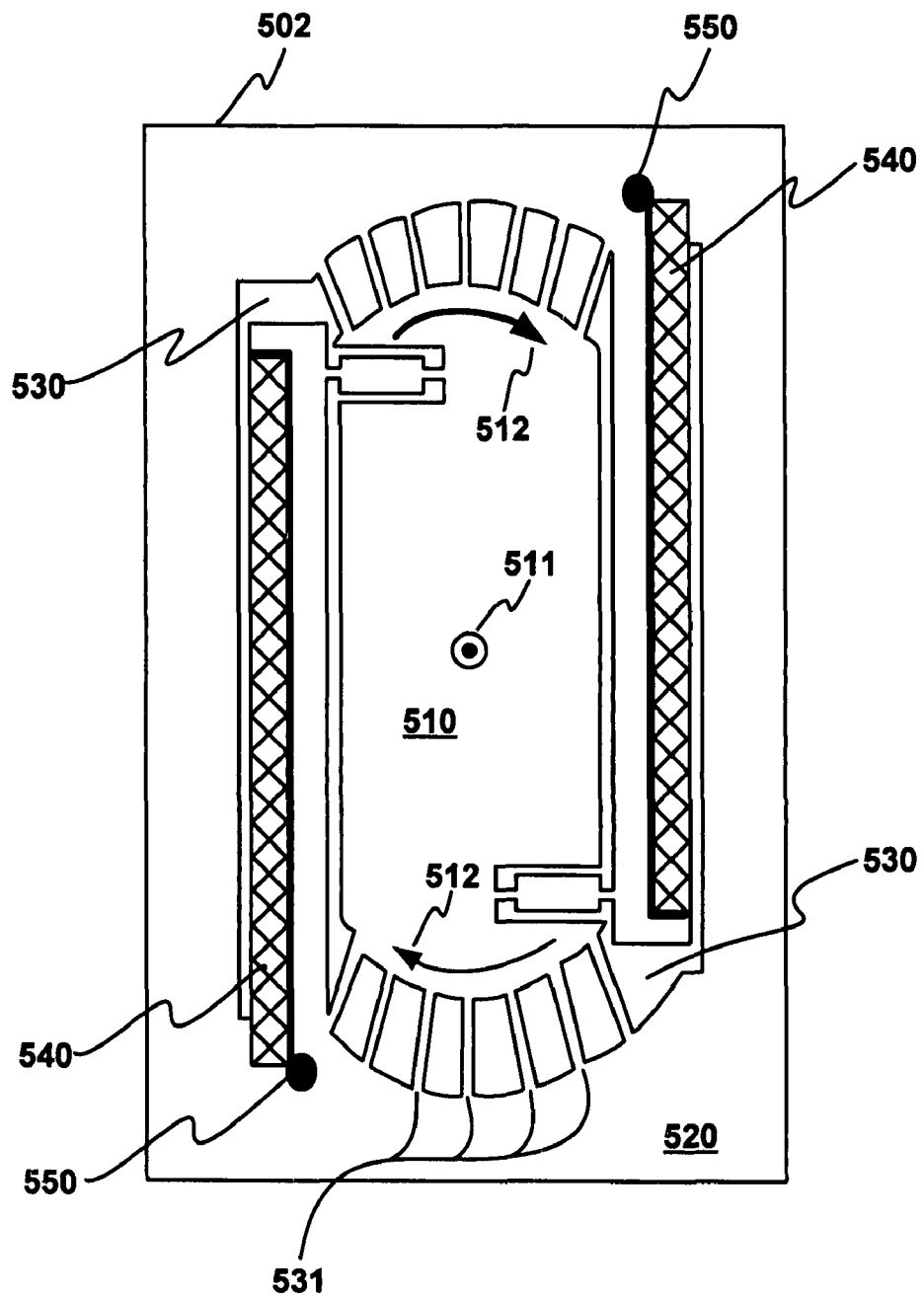
FIG. 5A is a plan view of a first spring assembly configuration, in accordance with an embodiment of the present invention.

With reference now to FIG. 5A, a first spring assembly configuration 501, in accordance with an embodiment of the present invention, is shown. The first spring assembly configuration 501 comprises a silicon substrate 502 that has been etched such that an inner portion 510 of the substrate 502 may be rotated relative to an outer portion 520 of the substrate 502. For instance, multiple mechanical components may be etched into the silicon substrate 502 to allow the inner portion 510 to bend relative to the outer portion 520. The silicon substrate 502 is configured to couple with the fixture 430 at a focal point 511. In this manner, rotating the inner portion 510 of the substrate 502 will cause the fixture 430, and consequently the slider 221 and magnetic read/write head 310, to be rotated relative to the magnetic storage medium 120.

The first spring assembly configuration 501 further comprises a spring assembly 530 that has been etched into the silicon substrate 502. The spring assembly 530 occupies a portion of the silicon substrate 502 where multiple portions of the silicon substrate have been etched out to form a structured network of carvings that partially separate the inner portion 510 of the substrate 502 from the outer portion 520. However, these carvings do not completely separate the inner portion 510 from the outer portion 520. Rather, the spring assembly 530 is etched within the silicon substrate 502 such that portions (examples of which are illustrated by 531) of the substrate 502 remain which physically connect the inner portion 510 and the outer portion 520 such that the inner portion 510 is physically suspended from the outer portion 520.

The spring assembly 530 is configured such that the application of push forces exerted relative to the inner portion 510 of the substrate 502 at different points on the spring assembly 530 causes the inner portion 510 of the silicon substrate 502 to be rotated, pursuant to a pure rotary motion 512, relative to the outer portion 520. In one embodiment, two different push forces are aligned in opposite parallel directions. Application of both of these push forces at opposite sides of the spring assembly 530 causes the inner portion 510 to rotate in a pure rotary motion 512 relative to the outer portion 520 of the substrate 502.

However, since the spring assembly 530 is etched within the silicon substrate 502 such that portions (examples of which are illustrated by 531) of the substrate 502 connect the inner portion 510 and the outer portion 520, removal of the push forces from the spring assembly 530 will enable the inner portion 510 of the silicon substrate 502 to return to its original position relative to the outer portion 520. In other words, the application of the push forces does not cause the position of the inner portion 510 relative to the outer portion 520 to be permanently changed. Rather, the spring assembly 530 causes the inner portion 510 to "spring" back to its original position when the push forces are removed. In this manner, push forces can be applied over time to the spring assembly 510 to create a plurality of pure rotary motions 512 over time.

It should be understood by those skilled in the art, however, that many possibilities exist for generating and applying such push forces to the spring assembly 530. For instance, piezoelectric devices that change shape in response to an applied voltage could be implemented such that a change in shape of the piezoelectric devices causes the spring assembly 530 to generate a rotary force. In one embodiment, multiple piezoelectric devices are positioned in close proximity to the spring assembly 530 such that changes in shape of these devices creates push forces that are applied to specific locations on the spring assembly 530. The combination of these push forces being simultaneously applied at such specific locations creates a pure rotary force that is ultimately applied by the pure rotary microactuator 410 to the fixture 430 and the slider 221 such that the magnetic read/write head 310 is rotated relative to the magnetic storage medium 120.

With reference still to the embodiment illustrated in FIG. 5A, the first spring assembly configuration 501 comprises two piezoelectric devices 540 that are coupled with the silicon substrate 502 by means of adhesive capillary intakes 550. The piezoelectric devices 540 are designed such that the devices 540 exhibit a converse piezoelectric effect in response to an applied electric field. Specifically, the piezoelectric devices 540 are configured to change shape when an electronic input signal reaches the devices 540. For instance, in an embodiment of the present technology, the piezoelectric devices 540 are configured to expand in response to an electronic input signal. This expansion causes the piezoelectric devices 540 to generate push forces which are applied to the spring assembly 530. The application of these push forces causes the inner portion 510 of the silicon substrate 502 to rotate in a pure rotary motion 512 relative to the outer portion 520 of the substrate 502.

Thus, the aforementioned embodiment utilizes two opposite perpendicular forces to induce a pure rotary motion 512. This pure rotary motion 512 causes the inner portion 510 of the silicon substrate 502, to which the fixture 430 is coupled, to rotate the fixture 430, the slider 221 and the magnetic read/write head 310 relative to the magnetic storage medium 120. In this manner, the induced pure rotary motion 512 allows the first spring assembly configuration 501 to realize a greater degree of stroke in comparison to past configurations.

In an alternative embodiment of the present invention, the piezoelectric devices 540 are configured to constrict in response to an electronic input signal. For example, the piezoelectric devices 540 may be coupled with the precise locations on the silicon substrate 502 such that the constriction of the piezoelectric devices 540 causes the devices 540 to generate pull forces that are applied to the spring assembly 530. The application of these pull forces would cause the inner portion 510 of the silicon substrate 502 to rotate in a pure rotary motion 512 relative to the outer portion 520 of the substrate 502. This pure rotary motion 512 would then cause inner portion 510 of the silicon substrate 502, to which the fixture 430 is coupled, to rotate the fixture 430, the slider 221 and the magnetic read/write head 310 relative to the magnetic storage medium 120.

It should be appreciated by those skilled in the art, though, that although the two piezoelectric devices 540 in the embodiment illustrated in FIG. 5A are coupled with the silicon substrate 502 by means of adhesive capillary intakes 550, the embodiment is not to be construed as being limited to such a means of adhesion. Rather, the use of adhesive capillary intakes 550, which could comprise the suction of an adhesive material into etched intake grooves on the surface of the silicon substrate 502 by means of a capillary force, has been presented merely as an example of how one skilled in the art might couple the piezoelectric devices 540 to the silicon substrate 502. This example has been presented due to the ubiquitous nature of capillary intake valves in modern day, small-scale fabrication techniques, but other methods of adhesion may also be implemented so long as the piezoelectric devices 540 remain coupled with the silicon substrate 502 during operation of the drive 100.

It should be further appreciated by those skilled in the art that the piezoelectric devices 540 may be comprised of various materials that are capable of exhibiting piezoelectric effects. In one embodiment, the piezoelectric devices 540 are comprised of lead zirconate titanate ($Pb(ZrTi)O_3$), which is a ceramic material commonly known as "PZT". Pursuant to this embodiment, the PZT material in the piezoelectric devices 540 causes the devices 540 to experience only small changes in shape in response to a change in voltage applied to these substrates 540. Such small changes in the shapes of the piezoelectric substrates 540 causes the push forces applied to the inner portion 510 of the silicon substrate 502 to be relatively weak. This enables the pure rotary microactuator 410 to make miniscule, high-precision changes to the position of the magnetic read/write head 310 relative to the magnetic storage medium 120 because the application of smaller push forces causes the inner portion 510 of the silicon substrate 502 to rotate a shorter distance.

In another embodiment, the piezoelectric devices 540 are comprised of multiple layers of piezoelectric material. For instance, the piezoelectric devices 540 could comprise a plurality of layers (e.g., 2-7 layers each) of PZT. The application of multilayered piezoelectric substrates would allow one skilled in the art to alter the manner in which the piezoelectric devices 540 move in response to an applied voltage. Thus, a multilayered piezoelectric configuration could be implemented in order to further increase the stroke that can be achieved by the pure rotary microactuator 410, or to vary the timing according to specific design specifications by taking advantage of the converse piezoelectric effect realized by the combination of the multilayered substrates.

It should be appreciated by those skilled in the art that by increasing the girth of the piezoelectric devices 540, the stiffness of the head gimbal assembly 220 will necessarily be increased. For instance, although ceramic PZT may be bent in response to an applied voltage, PZT is nevertheless a solid material exhibiting a certain degree of inherent resistance to vibrational forces. Thus, by increasing the amount of material that comprises the piezoelectric devices 540, these devices will become increasingly resistant to vibrational forces, while still exhibiting a converse piezoelectric effect in response to an applied voltage. Furthermore, since the piezoelectric devices 540 are coupled with the silicon substrate 502, increasing the stiffness of the piezoelectric devices 540 will cause the stiffness of the substrate 502, and consequently the pure rotary microactuator 410, to also be increased.

In an alternative embodiment of the present invention, both the stroke and stiffness of the head gimbal assembly 220 are increased by increasing the length of the piezoelectric devices 540. Mechanically speaking, when longer piezoelectric materials are implemented, the piezoelectric devices 540 will experience a more significant change in shape, which in turn will create stronger push forces. The application of stronger push forces to the spring assembly 530 causes the inner portion 510 of the silicon substrate 502 to rotate a greater distance relative to the outer portion 520, which increases the stroke of the head gimbal assembly 220. In addition, since an increase in the length of the piezoelectric devices 540 will necessarily cause the devices 540 to comprise a greater amount of piezoelectric material, increasing the length of the piezoelectric devices also increases the stiffness of the pure rotary microactuator 410.

It should be appreciated by those skilled in the art, however, that the pure rotary microactuator 410 may be configured to make small, high-precision changes to the position of the magnetic read/write head 310 while still allowing the head gimbal assembly 220 to realize a sufficient absolute correction range (e.g., a stroke of between 0.5 and 1 micrometers) such that the pure rotary microactuator 410 is still able to induce a displacement of the slider 221 in order to compensate for larger vibrations. For instance, a controlled voltage could be applied to the piezoelectric devices 540 according to how strong the pure rotary force 420 needs to be to correctly displace the magnetic read/write head 310 relative to a specific data array on the surface of the magnetic storage medium 120. Thus, the pure rotary microactuator 410 may be designed to make smaller and larger changes in slider displacement depending on the distance that the read/write head 310 must be displaced relative to the concentric data arrays of the magnetic storage medium 120.

In an alternative embodiment, the strength of the electronic input signal that is applied to the piezoelectric devices is varied in order to alter the pure rotary motion that is applied to the slider 221 and the magnetic read/write head 310. For instance, the piezoelectric devices 540 could be configured such that a stronger electronic input signal causes the devices 540 to experience a more significant change in shape. Further, the spring assembly 530 could be configured such that a more significant change in shape of the piezoelectric devices 540 causes the distance that the inner portion 510 of the silicon substrate 502 rotates relative to the outer portion 520 to increase such that the slider 221 is rotated a greater distance. This serves to increase the overall stroke of the head gimbal assembly 220.

In another embodiment, the piezoelectric devices 540 are configured such that a stronger electronic input signal increases the speed with which the devices 540 change shape. Further, the spring assembly 530 is configured such that a quicker change in shape of the piezoelectric devices 540 increases the speed with which the inner portion 510 of the silicon substrate 502 rotates relative to the outer portion 520. This serves to increase the overall speed with which the pure rotary microactuator 410 can adjust the location of the magnetic read write head 310 relative to the magnetic storage medium 120.

In another embodiment, the pure rotary microactuator 410 is further configured to recognize and correct for vibrations present in the head gimbal assembly 220 during operation of the drive 100. For instance, the piezoelectric devices 540 could comprise a first piezoelectric material exhibiting a direct piezoelectric effect, wherein the material generates an electrical current in response to applied physical stress, as well as a second piezoelectric material exhibiting a converse piezoelectric effect, as previously discussed. In this manner, the piezoelectric devices 540 could be configured to bend in response to a sensed vibrational force, and send an electronic signal to the pure rotary microactuator 410. Upon receiving this electronic signal, the pure rotary microactuator 410 would recognize that the piezoelectric devices 540 have been bent, and then send an electronic signal to the devices 540 that causes them to bend in the opposite direction. This type of controlled countermeasure would help to alleviate or reduce vibrations in the microactuator 410.

The aforementioned embodiment is useful because it increases the precision with which the pure rotary microactuator 410 is able to displace the magnetic read/write head 310 to a specific location because vibrations that effect the positioning of the read/write head 310 relative to the magnetic storage medium 120 are attenuated. In addition, there is a smaller chance of drive failure because the probability of the slider 221 contacting the magnetic storage medium 120 due to a vibration in the head gimbal assembly 220 will be decreased. In other words, it is less likely that the slider 221 and the magnetic storage medium 120 would collide, which could cause damage to the slider 221 and/or the surface of the magnetic storage medium 120.

Figure 5B:
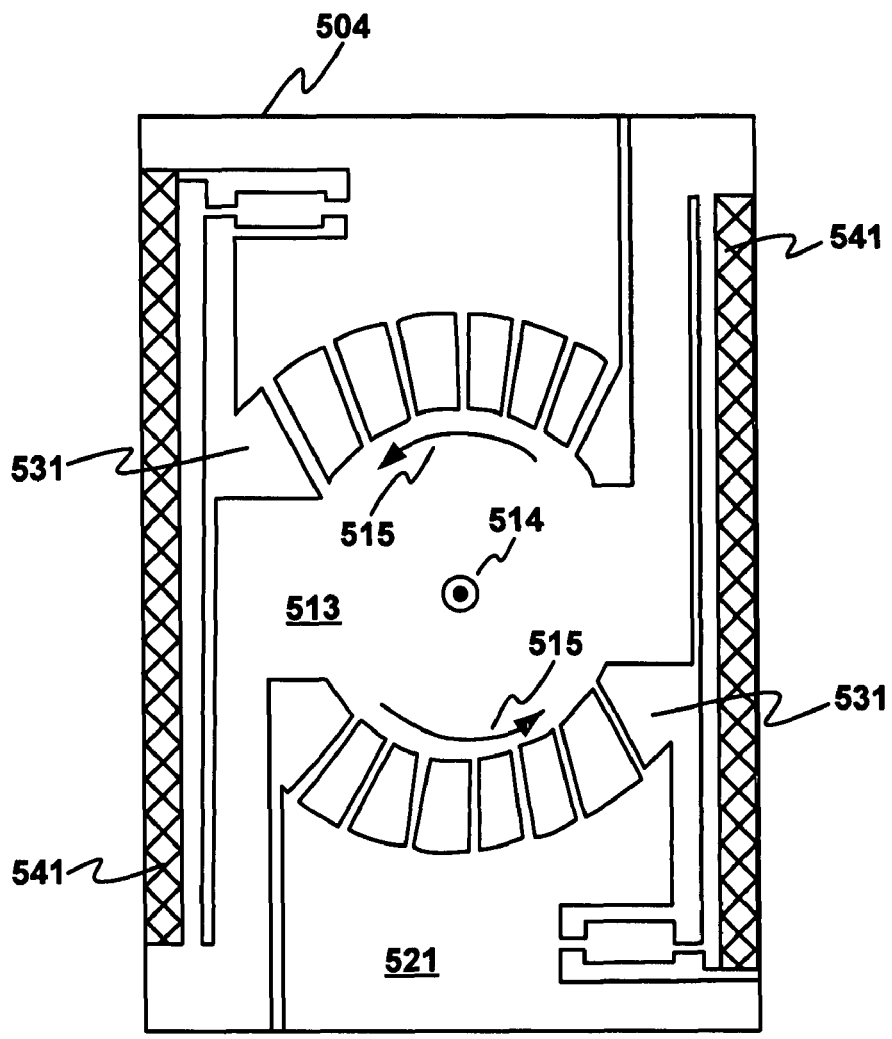
FIG. 5B is a plan view of an alternative spring assembly configuration, in accordance with an embodiment of the present invention.

With reference now to FIG. 5B, an alternative spring assembly configuration 503, in accordance with an embodiment of the present invention, is shown. This configuration 503 is an example of an alternative design with respect to the first spring assembly configuration 501. The alternative spring assembly configuration 503 comprises a silicon substrate 504 that has been etched such that an inner portion 513 of the substrate 504 may be rotated relative to an outer portion 521 of the substrate 504. The silicon substrate 504 is configured to couple with the fixture 430 at a focal point 514. In this manner, rotating the inner portion 513 of the substrate 504 will cause the fixture 430, and consequently the slider 221 and magnetic read/write head 310, to be rotated relative to the magnetic storage medium 120.

The alternative spring assembly configuration 503 further comprises a spring assembly 531 that has been etched into the silicon substrate 504. The spring assembly 531 is configured such that the application of push forces exerted relative to the inner portion 513 of the substrate 504 at opposite sides of the spring assembly 531 causes the inner portion 513 of the silicon substrate 504 to be rotated, pursuant to a pure rotary motion 515, relative to the outer portion 521. Furthermore, the structure of the spring assembly 531 is configured such that removal of the push forces from the spring assembly 531 will enable the inner portion 513 of the silicon substrate 504 to return to its original position relative to the outer portion 521 such that the inner portion 513 "springs" back to its original position when the push forces are removed, which allows the spring assembly 513 to create a plurality of pure rotary motions 515 over time.

With reference still to FIG. 5B, the alternative spring assembly configuration 503 comprises two piezoelectric devices 541 that are coupled with the silicon substrate 504. The piezoelectric devices 541 are configured to change shape when an electronic input signal reaches the devices 541. For instance, in an embodiment of the present technology, the piezoelectric devices 541 are configured to expand in response to an electronic input signal. This expansion causes the piezoelectric devices 541 to generate push forces which are applied to the spring assembly 531. The application of these push forces causes the inner portion 513 of the silicon substrate 504 to rotate in a pure rotary motion 515 relative to the outer portion 521 of the substrate 504. This pure rotary motion 515 causes the inner portion 513 of the silicon substrate 504, to which the fixture 430 is coupled, to rotate the fixture 430, the slider 221 and the magnetic read/write head 310 relative to the magnetic storage medium 120, thus increasing the stroke associated with the head gimbal assembly 220.

In another embodiment, the pure rotary microactuator utilizes micro-electromechanical system ("MEMS") based technology. MEMS technology allows those skilled in the art to integrate sensors, electronics and mechanical components on a single silicon substrate utilizing microfabrication technologies. In one embodiment of the present technology, a micromachining technology is utilized to selectively etch away portions of the silicon substrate 504 in order to construct the spring assembly 531, and to construct the piezoelectric devices 541 by fabricating and combining multiple piezoelectric layers. The piezoelectric devices 541 are then coupled with specific points on the fabricated silicon substrate 504 such that the devices 541 can mechanically apply push forces to the spring assembly 531. Those skilled in the art will appreciate that implementation of the present embodiment would allow a single silicon substrate in a microactuator to realize an augmented degree of functionality, efficiency and reliability, all at a cost that is relatively low in comparison to other fabrication technologies, because MEMS based devices may be manufactured using fabrication techniques similar to those used for integrated circuits.

With reference now to FIG. 6, a process 600 for controlling a microactuator coupled with a slider in a hard disk drive (HDD) in accordance with an embodiment of the present invention is shown. The process 600 comprises determining that a slider needs to be rotated relative to a magnetic storage medium in a hard disk drive (HDD) 610. The slider is coupled with a microactuator comprising a spring assembly etched within a silicon substrate, a first piezoelectric device coupled with a first portion of the spring assembly, and a second piezoelectric device coupled with a second portion of the spring assembly. The process further comprises generating an electrical input signal 620, and applying a pure rotary force to the spring assembly by applying the electrical input signal to the first and second piezoelectric devices whereby inducing a change in shape of the first and second piezoelectric devices that provides a first push force to the first portion in a first direction and a second push force to the second portion in a second direction different from the first direction, wherein the first and said second push forces rotate the spring assembly with respect to the silicon substrate 630. Thus, the rotation of the spring assembly relative to the silicon substrate causes the slider, which is coupled with the microactuator, to rotate relative to the magnetic storage medium of the hard disk drive (HDD).

It should be appreciated by one skilled in the art that various methods exist for implementing the process 600 of FIG. 6. For example, the process 600 may be expanded such that the spring assembly of the microactuator is coupled with the slider. In this manner, rotating the spring assembly relative to the remainder of the microactuator will apply the pure rotary force to the slider.

In another embodiment, the process 600 comprises changing the strength of the first and second push forces by varying the electrical input signal. In this manner, changing the strength of the first and second push forces varies the amount of rotation applied to the spring assembly within a specific period of time. For instance, in one embodiment of the present technology, the first and second piezoelectric devices could be configured such that a stronger electronic input signal causes the first and second piezoelectric devices to increase the strength of the first and second push forces, respectively. Increasing the strength of the first and second push forces increases the strength of the pure rotary force that is applied to the spring assembly. By coupling the rotating spring assembly to the slider, the pure rotary force would be similarly applied to the slider, and the slider would consequently rotate relative to the magnetic storage medium of the hard disk drive (HDD). Thus, a person skilled in the art could implement the process 600 so as to increase the stroke associated with a head gimbal assembly in the hard disk drive (HDD).

In another embodiment, the first and second piezoelectric devices are configured such that a stronger electronic input signal increases the speed with which the first and second devices change shape. Further, the spring assembly is configured such that a quicker change in shape of the first and second piezoelectric devices increases the speed with which the spring assembly rotates relative to the silicon substrate. In this manner, a person skilled in the art can increase the speed with which the slider is rotated relative to the magnetic storage medium in the hard disk drive (HDD). This allows a magnetic read/write head that is coupled with the slider to be more quickly repositioned relative to a specific data array on the surface of the magnetic storage medium, which translates into better communication efficiency between drive components as well as better overall drive performance.

It should be appreciated by those skilled in the art that various embodiments of the present technology offer potentially significant gains in the reliability and operating efficiency of a hard disk drive (HDD) over prior methods. For example, certain past implementations of slider displacement utilized a "push-pull" motion that caused one or more flexible devices within the microactuator to all bend in a specific direction, oftentimes creating an arch motion. Due to the motion associated with the bending of these devices in the same direction, these past implementations realized the disadvantage of the generation of an inertia force during operation of the head gimbal assembly.

In contrast, an embodiment of the present invention utilizes two or more push forces to induce a pure rotary moment and motion that increases the stroke of a head gimbal assembly while simultaneously avoiding the types of inertia forces that plagued past implementations of slider displacement. In addition, since a person skilled in the art can implement embodiments of the present technology by etching pieces from a silicon substrate in order to create an embedded spring assembly, the weight and volume of the microactuator can be correspondingly minimized, which not only cuts down on the amount of inertia generated during first stage actuation, but also serves to decrease the amount of windage excitation experienced by the head gimbal assembly and allows for a higher slider mode frequency. Thus, various embodiments of the present invention teach that a person skilled in the art does not need to settle for the status quo regarding hard drive reliability and efficiency.

In addition, previous push-pull implementations used a single feed signal to bend two flexible devices in the same direction. In contrast, various embodiments of the present technology utilize the same electronic input signal to bend piezoelectric devices in opposite directions, thus creating push forces having directivities in opposing directions. The combination of these push forces at specific points on the spring assembly creates the desired pure rotary motion, which may then be translated to the slider. In this manner, a pure rotary motion is created with only a single electronic input signal, which simplifies the design of the microactuator, since multiple input signals are unnecessary to create the rotary motion. Indeed, various embodiments of the present invention allow the mass of a pure rotary microactuator to be minimized, which cuts down on the amount of inertia generated during drive operation, because the simplified design requires the implementation of relatively few components.

Furthermore, in addition to the benefits realized by being able to simultaneously increasing the stroke and stiffness realized by a head gimbal assembly, it should be appreciated by those skilled in the art that head gimbal assemblies implementing principles of the present technology will be easier to tune with respect to past configurations. For example, an embodiment of the present invention could be configured such that an electronic input signal delivered to the piezoelectric devices may be varied in order to change the amount of stroke and stiffness that is achieved at a given point in time. In another embodiment, the piezoelectric devices that are configured to generate and apply push forces to the spring assembly comprise a specific piezoelectric material that has a requisite inherent degree of stiffness, which allows for miniscule changes in the shape of the piezoelectric devices in response to the electronic input signal, thus allowing the pure rotary microactuator to be more easily fine tuned with respect to past implementations. This type of extensibility offers potentially significant advantages in the field of microactuator design and implementation.

It should be further understood that either the stroke or the stiffness of the head gimbal assembly may be of more importance during the design of a specific microactuator. Thus, a person skilled in the art may chose to concentrate on adjusting either the stroke or the stiffness as the primary design parameter, depending on which is more important for the tuning adjustment. For example, in one embodiment of the present invention, the electronic input signal that is delivered to the piezoelectric devices is changed according to how much stroke is needed, since the application of a greater voltage to the piezoelectric material will cause a more significant shape change, which in turn increases the strength of the push forces applied to the spring assembly. As previously stated, the application of stronger push forces will increase the strength of the pure rotary force applied to the slider, which increases the stroke of the head gimbal assembly.

In another embodiment, the stiffness of the head gimbal assembly is increased by varying the electronic input signal. For instance, the piezoelectric devices may comprise a specific piezoelectric material which has an inherent stiffness that is inversely proportional to an applied voltage. In this manner, decreasing the strength of a voltage applied to the piezoelectric devices will cause the stiffness of these devices, as well as the pure rotary microactuator, to increase. Thus, it should be understood that factors such as component composition and signal generation may be varied in order to adjust the stroke and stiffness of the head gimbal assembly and to fine tune the pure rotary microactuator.

Although various embodiments of the present invention are described in the context of etching a spring assembly within a silicon substrate, it should be appreciated by those skilled in the art that the present invention is not limited to the use of a silicon substrate. The use of a silicon substrate has been presented merely as an example of a material that may be used in accordance with various embodiments of the present technology. In view of the ubiquitous nature of silicon in electronics manufacturing, as well as modern advances in the fabrication of silicon substrates, the use of a silicon substrate would allow a person skilled in the art to implement a pure rotary spring assembly, as taught by the various embodiments discussed herein. However, other materials also exist that could be used for these same purposes. Thus, it is understood that various embodiments of the present technology may be implemented by etching a spring assembly in a material other than silicon, as long as the mechanical or chemical characteristics of such material do not interfere with the ability of the spring assembly to generate a pure rotary force that can be applied to another object, such as a fixture or a slider in a head gimbal assembly.

Furthermore, it should be understood that although various embodiments of the present invention are described in the context of rotating a slider relative to a magnetic storage medium in a hard disk drive (HDD), the foregoing embodiments are merely exemplary of various implementations of principles of the present technology. Therefore, it should be understood that various embodiments of the present invention may apply to any devices, configurations, or systems in which a first object needs to be rotated relative to a second object.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A pure rotary microactuator comprising:
a spring assembly etched within a silicon substrate;
a first piezoelectric device coupled with a first portion of said spring assembly, said first piezoelectric device changing shape in response to an electrical input signal whereby providing a first push force to said first portion in a first direction; and
a second piezoelectric device coupled with a second portion of said spring assembly, said second piezoelectric device changing shape in response to said electrical input signal whereby providing a second push force to said second portion in a second direction different from said first direction, said first and said second push forces rotating said spring assembly with respect to said silicon substrate, wherein said first and second directions are parallel, and wherein said first and said second piezoelectric devices are at an outer perimeter of said spring assembly.

2. The pure rotary microactuator as recited in claim 1, wherein said pure rotary microactuator is a micro-electromechanical (MEMS) based pure rotary microactuator.

3. The pure rotary microactuator as recited in claim 1, wherein said spring assembly comprises a plurality of mechanical components etched within said silicon substrate.

4. The pure rotary microactuator as recited in claim 1, wherein said spring assembly is coupled with said a slider such that rotating said spring assembly causes said slider to rotate.

5. The pure rotary microactuator as recited in claim 1, wherein said first and second push forces are aligned in opposite parallel directions.

6. The pure rotary microactuator as recited in claim 1, wherein said first and second piezoelectric devices each comprise lead zirconium titanate (PZT).

7. The pure rotary microactuator as recited in claim 1, wherein said first and second piezoelectric devices each comprise a plurality of layers of lead zirconium titanate (PZT).

8. The pure rotary microactuator as recited in claim 1, wherein varying said electrical input signal varies the amount of rotation applied to said spring assembly.

9. A hard disk drive (HDD) device comprising:
a housing;
a magnetic storage medium coupled with said housing, said magnetic storage medium rotating relative to said housing;
an actuator arm coupled with said housing, said actuator arm moving relative to said magnetic storage medium;
a slider assembly comprising a magnetic read/write head that magnetically writes data to and magnetically reads data from said magnetic storage medium; and
a pure rotary microactuator coupled between said actuator arm and said slider assembly, said pure rotary microactuator applying a pure rotary motion to said slider assembly to rotate said slider assembly relative to said magnetic storage medium, said microactuator comprising:
a spring assembly etched within a silicon substrate;
a first piezoelectric device coupled with a first portion of said spring assembly, said first piezoelectric device changing shape in response to an electrical input signal whereby providing a first push force to said first portion in a first direction; and
a second piezoelectric device coupled with a second portion of said spring assembly, said second piezoelectric device changing shape in response to said electrical input signal whereby providing a second push force to said second portion in a second direction different from said first direction, said first and said second push forces rotating said spring assembly with respect to said silicon substrate, wherein said first and second directions are parallel, and wherein said first and said second piezoelectric devices are at an outer perimeter of said spring assembly.

10. The hard disk drive (HDD) device recited in claim 9, wherein said pure rotary microactuator is a micro-electromechanical (MEMS) based pure rotary microactuator.

11. The pure rotary microactuator as recited in claim 9, wherein said first and second piezoelectric devices each comprise lead zirconium titanate (PZT).

12. The pure rotary microactuator as recited in claim 9, wherein said first and second piezoelectric devices each comprise a plurality of layers of lead zirconium titanate (PZT).

13. The pure rotary microactuator as recited in claim 9, wherein varying said electrical input signal varies the amount of rotation applied to said spring assembly.

* * * * *